United States Patent
Ishak

[11] 3,806,256
[45] Apr. 23, 1974

[54] COLORIMETERS

[75] Inventor: Ishak Girgis Hanna Ishak, Teddington, England

[73] Assignee: The Paint Research Association, London, England

[22] Filed: Aug. 9, 1972

[21] Appl. No.: 278,969

[30] Foreign Application Priority Data
Aug. 12, 1971   Great Britain.................... 38003/71

[52] U.S. Cl.................. 356/186, 250/227, 356/209
[51] Int. Cl.......................... G01j 3/48, G01n 21/48
[58] Field of Search ............. 356/186, 209; 250/227

[56] References Cited
UNITED STATES PATENTS
3,573,476   4/1971   Falcoff et al........................ 250/227
3,383,979   5/1968   Gibson............................... 250/227

OTHER PUBLICATIONS
"Fibre Optics...Colorimeter"; Ishak; Optica Acta 1970; Vol. 17, No. 10, pg. 725–732

Primary Examiner—Ronald L. Wibert
Assistant Examiner—V. P. McGraw
Attorney, Agent, or Firm—Molinare, Allegretti, Newitt & Witcoff

[57] ABSTRACT

This invention relates to the light collecting heads of light measuring devices such as colorimeters. The head has a light collecting ring whose axis is a normal to the surface from which light is to be received, the ring being arranged to receive light from a discrete area of the surface from completely around the discrete area, the light received being arranged to pass through one or more light guides to a light detector. By viewing the discrete area of the surface from all directions around it, it is found that one can average out directional irregularities in reflection from the sample.

4 Claims, 3 Drawing Figures

COLORIMETERS

This invention relates to the light collecting heads of light measuring devices such as colorimeters, that is to say devices for the measurement of colour, and spectro-photometers, and to light measuring devices incorporating such heads.

BACKGROUND TO THE INVENTION

The measurement of colour in objective terms depends upon a determination of a visual match with a combination of defined stimuli. To provide an international standard the Commission Internationale de L'Eclairage (C.I.E.) has adopted a standard colour measurement system based on the spectral response curves for a Standard observer and three primary stimuli X, Y and Z, defined in terms of lights of given wavelengths. Any colour can be accurately defined in terms of the amounts of these three stimuli required to match it.

The C.I.E. also recommended various viewing and illuminating angles when measuring colour. Thus in 1931 they recommended illumination at an angle normal to the surface of the sample under test and viewing at an angle of 45° to the surface of the sample for opaque surfaces. In 1967 three other arrangements were recommended. In my copending Application Ser. No. 107,054 filed Jan. 18, 1971 I have described a colorimeter which has a sensing head which collects light from a number of directions spaced around the sample under test, the collected light being transmitted to the detector by suitable means such as light guides, e.g. bundles of fibre optics. In that Patent Application we suggest that 6 to 8 collecting directions are usually sufficient, these directions being preferably evenly spaced angularly around the sample under test at, for example, angles of 45° to the surface of the sample.

I find, however, that even when one collects light from 6 to 8 collecting directions around the sample in an attempt to average out directional irregularities in reflection from the sample, inaccuracies can still occur with certain samples, particularly those with a rough surface finish, e.g. textile materials.

It is therefore, an object of the invention to provide a sensing head which avoids such inaccuracies due to irregular directional reflection from samples.

BRIEF DESCRIPTION OF THE INVENTION

According to the invention there is provided a sensing head for a colorimeter or other light measuring device comprising a light collecting ring whose axis is a normal to the surface under test and which is arranged to receive light from a discrete area of the sample at a set predetermined angle, e.g. 45°, from completely around that discrete area, the light received by the ring being arranged to pass to one or more light guides and be transmitted by them to a light detector. The invention also extends to light measuring devices such as colorimeters which incorporate such a sensing head.

By viewing the sample from all directions instead of a number of discrete directions one can of course average out completely directional irregularities in reflection from the sample.

The light received by the collecting ring can be conducted to a detector by means of a single light guide, e.g. a large bundle of fibre optics. Preferably, however, the light conducted to the detector by a number of relatively smaller bundles of fibre optics which are relatively flexible and so the sensing head need not be fixed relative to the detector. Usually about 16 bundles of fibre optics suitably screened to exclude extraneous light is a satisfactory number, the sensing head ends of the bundles being spread evenly to form the collecting ring. For example, there is preferably a sufficient number of fibre optics in the bundle for the ends of these fibre optics to fill the area of the collecting ring and be cemented in position so that the axes of the end parts of the cibre optics are at the set angle to the sample.

The light conducted by the light guide or guides is preferably directed at a diffuser. Then, before passing to a detector, e.g. a photomultiplier, the light passes through a suitable tristimulus filter to match one of the functions X, Y or Z. A tristimulus filter is provided for each colour matching function, and by using each tristimulus filter in turn values for X, Y and Z can be obtained. The tristimulus filter can be a single subtractive colour filter, a combination of subtractive colour filters or a parallel or side by side or mosaic additive arrangement.

Where a large number of bundles of fibre optics are used as the light guides they are preferably arranged to direct their conducted light onto a single spot on the diffuser so that, in effect, this diffuser acts as a new source of light for the detector so giving accurate averaging of the light from all of the bundles. This is not essential, however, and instead it is often sufficient for the light from all of the bundles to be directed at the diffuser.

As noted above the detector can be a photomultiplier whose output is fed to a digital voltmeter to give readings corresponding to the values of X, Y and Z, or for that matter some other colour matching function.

The sample viewed by the collecting ring in the sensing head is preferably illuminated in a direction normal to the plane of its surface. This can readily be achieved in a simple fashion by means of an additional light guide, e.g. one or more bundles of fibre optics, one end of which is coaxial with the collecting ring in the sensing head and so illuminates the discrete area of the sample and the other end of which collects light from a suitable source such as an electrical lamp energised by a constant current to give, for example, the C.I.E. standard illuminant A.

The sensing head can be of a shape, e.g. a hemisphere, which fits over the sample to be tested so as to exclude extraneous light. This is not, however, necessary when the sample and sensing head are completely shielded from extraneous light, e.g. when the head is used to measure the colour of paint at a paint/air interface using the head 12c shown in FIG. 6 of of my copending Application Ser. No. 107,054 filed Jan. 18, 1971.

Besides being used to measure the colour of samples in the visible region of the spectrum, the head can, of course, be used to measure the fluorescence of samples irradiated with ultra violet light and also to measure the spectral energy distribution of samples outside the visible region of the spectrum by appropriate choice of materials for the light guides.

BRIEF DESCRIPTION OF THE DRAWINGS

A colorimeter employing a sensing head according to the invention will now be described, by way of example, with reference to the accompanying drawings, in which.

DESCRIPTION OF THE PREFERRED EMBODIMENT

Figure 1:
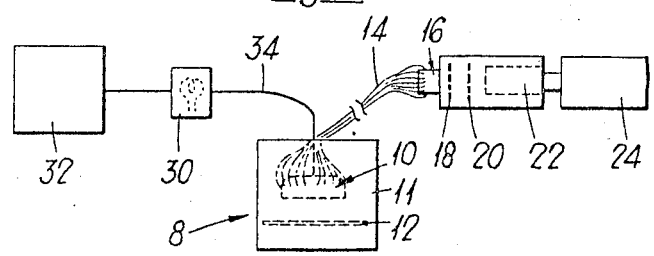
FIG. 1 is a general diagrammatic arrangement of the colorimeter.

The colorimeter 8 comprises a sensing head 10 according to the invention which is arranged in a light-proof box 11 to view a sample 12. Light collected by the head 10 passes along light guides 14, sixteen bundles of fibre optics light guides are usually sufficient. The guides 14 terminate in a detector head 16 where the light from the guides is directed towards a diffuser 18. The diffused light then passes through a suitable tristimulus filter 20 which, as noted above, can be a single subtractive colour filter or a combination of such filters or a parallel or mosaic additive filter. The filter light then impinges on a photomultiplier 22 whose output is fed to a digital voltmeter 24 which gives an output value corresponding to X, Y or Z depending upon which tristimulus filter 20 is in place at any instant.

The sample 12 is illuminated normally by light from an electric lamp 30 powered by a stabilized current source 32, the light being conducted from the lamp 30 to the head 10 by means of a light guide 34, e.g., bundle of fibre optics 34 screened to exclude extraneous light. The lamp 30 is, for example, run at the colour temperature of C.I.E. standard illuminant A.

Figure 3:
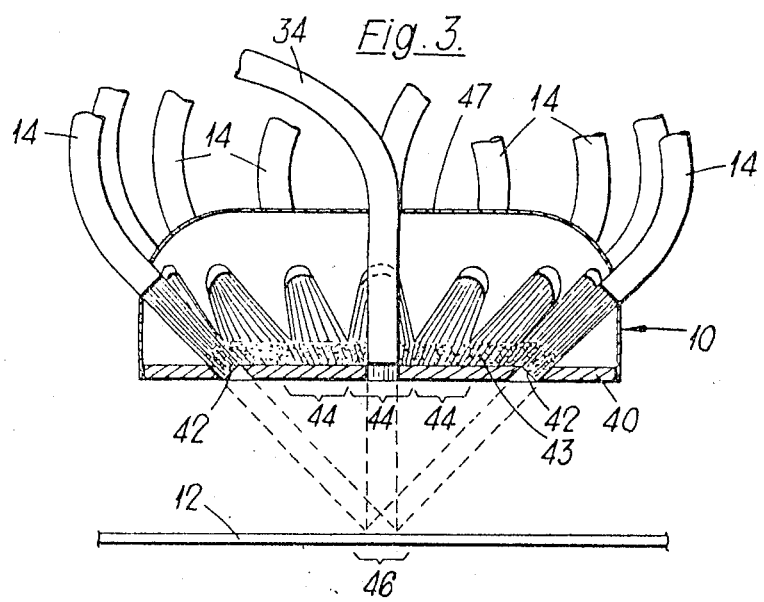
FIG. 3 is an enlarged cross-section through the sensing head according to the invention.

The head 10 is shown enlarged in FIG. 3. It comprises a flat circular opaque plate 40 into which is fitted an annular collecting ring 42. The end of the light guide 34 terminates axially in the plate and illuminates the sample normally, i.e., at 90° to the surface of the sample. It illuminates a small area 46 of the sample.

The collecting ring 42 is coaxial with the end of the light guide 34. It is formed by cementing together the ends of a large number of fibre optics from say the sixteen light guides 14. The sensing head ends of the guides 14 are apread out from their normal roughly circular shaped bundles to form roughly equal curved segment parts 44 of the ring 42, all of these parts being juxtaposed and all the ends of the fibre optics being encased in a cement 43 to form the complete uniform ring 42. Any suitable cement can be used.

It will be noted that the ends of all of the fibre optics are directed in at an angle α of about 45° to the axis of illumination. In this way the fibre optics all collect light from the small illuminated area 46 on the surface of the sample. In practice this area will be about 1 cm in diameter.

An opaque shell 47 fits over the plate 40 to exclude extraneous light from the ends of the light guides and the latter pass through the shell 47. Between their sensing head ends and detector head ends the bundles of fibre optics are, of course, screened to exclude extraneous light.

The detector ends of the light guides 14 are held in ports 60 in a cylinder 62 so that the light they emit is directed to a single spot 64 on the diffuser 18. This ensures accurate averaging of the light falling on the spot 64 since this spot then effectively becomes a single light source from which light passes through the filter 20 to the photomultiplier 22.

The sensing head 10 collects light from all directions at 45° to the normal around the illuminated spot 46 on the surface and the collected light passes along the fibre optics which are divided into bundles forming the light guides for the sake of convenience and is all supplied to the detector head 16. Therefore, any differential angular reflection of light due to the surface characteristics of the sample 12 are averaged out. The sensing head 10 is therefore very suitable for use with the measurement of the colour of samples which have a coarse textured surface with preferential directions of reflection, e.g. a textile material.

The sensing head 10 is also relatively simple and compact and the single light guides 14 and 34 are flexible so that they can be moved relative to and be remote from the remainder of the colorimeter. This latter feature is of course of importance because for example the photomultiplier and digital voltmeter are delicate instruments while the head 10 is robust and can be exposed to environments quite unsuitable for these delicate instruments.

Figure 2:
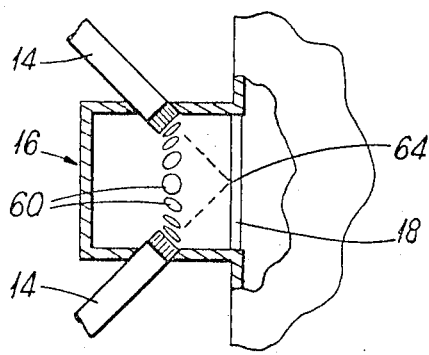
FIG. 2 is an enlarged detail of the detector end of the light guides.

The detector head 16 can be as described and shown in FIG. 2 of my copending application Ser. No. 107,054 filed Jan. 18, 1971 and provided with a number of filters over the ends of some or all of the light guides 14 to improve the accuracy of the colorimeter in its simulation of the C.I.E. standard observer.

The colorimeter just described is a single beam colorimeter. It can readily be converted to what is known as a double beam colorimeter by providing means for transmitting light when required directly from the lamp 30 to the detector head 16 and not to the sample 12. Suitably these means can be another bundle of fibre optics together with a shutter which allows light from the lamp 30 to pass either to the sample or to the detector head. The advantage of a double beam instrument is that it can easily be checked from time to time to ensure that the lamp and the detector are remaining constant in their output and response, respectively.

Besides being used as a colorimeter, a spectrophotometer using a sensing head according to the invention can be formed by substituting a monochromatic light source, e.g. a monochromator, for the lamp 30 and eliminating the tristimulus filter 20.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A light measuring device for measuring the light reflected from the surface of a sample under test, comprising:
    a stabilized light source,
    a bundle of fiber optics having an end arranged to receive light from said light source and a light-emitting end for illuminating a discrete area of said sample's surface,
    a light-collecting ring having an annular receiving face directed to receive light from a discrete area of said surface at a predetermined angle from completely around said discrete area of said surface,
    a sensing head for holding said light-emitting end of said bundle of fiber optics and said light collecting ring so that the axis of said light-emitting end and the axis of said ring are coincident, means for holding said head in relation to said sample whereby said light-emitting end is arranged to illuminate said discrete area in a direction normal to said sample's surface and said annular light receiving face is directed to collect light from said discrete area at a substantially constant angle completely around said axis of said ring, at least one additional bundle of fiber optics having light-collecting ends arranged to receive light collected by said ring and transmit said light along their length, a light detector arranged to receive light from said additional bundle of fiber optics, and means for determining the output of said light detector.

2. A device as set forth in claim 1, further comprising a diffuser positioned between said additional bundle of fiber optics and said detector, such that said detector receives light collected by said ring after passage through said diffuser.

3. A device as set forth in claim 1 in which there is a plurality of additional bundles of fiber optics.

4. A device as set forth in claim 3 in which said collecting ring comprises said light collecting ends of said additional bundles of fiber optics spread out around the ring and an optical cement arranged to hold said ends normal to said annular face so that they are directed towards said discrete area.

* * * * *